:

US011084021B2

(12) United States Patent
Schmidt et al.

(10) Patent No.: US 11,084,021 B2
(45) Date of Patent: Aug. 10, 2021

(54) ACID-RESISTANT CATALYST SUPPORTS AND CATALYSTS

(71) Applicant: W. R. Grace & Co.—Conn., Columbia, MD (US)

(72) Inventors: Stephen R Schmidt, Silver Spring, MD (US); Cristian Libanati, Silver Spring, MD (US)

(73) Assignee: W.R. GRACE & CO.—CONN, Columbia, MD (US)

( * ) Notice: Subject to any disclaimer, the term of this patent is extended or adjusted under 35 U.S.C. 154(b) by 146 days.

(21) Appl. No.: 15/770,823

(22) PCT Filed: Oct. 25, 2016

(86) PCT No.: PCT/US2016/058604
§ 371 (c)(1),
(2) Date: Apr. 25, 2018

(87) PCT Pub. No.: WO2017/074909
PCT Pub. Date: May 4, 2017

(65) Prior Publication Data
US 2020/0023339 A1 Jan. 23, 2020

Related U.S. Application Data

(60) Provisional application No. 62/246,733, filed on Oct. 27, 2015.

(51) Int. Cl.
| | | |
|---|---|---|
| *B01J 21/06* | (2006.01) | |
| *B01J 23/883* | (2006.01) | |
| *B01J 23/885* | (2006.01) | |
| *B01J 23/887* | (2006.01) | |
| *B01J 23/89* | (2006.01) | |
| *B01J 35/00* | (2006.01) | |
| *B01J 35/10* | (2006.01) | |
| *B01J 37/00* | (2006.01) | |
| *B01J 37/02* | (2006.01) | |
| *B01J 37/08* | (2006.01) | |
| *B01J 37/20* | (2006.01) | |
| *C10G 3/00* | (2006.01) | |

(52) U.S. Cl.
CPC ........... *B01J 21/063* (2013.01); *B01J 23/883* (2013.01); *B01J 23/885* (2013.01); *B01J 23/8878* (2013.01); *B01J 23/8993* (2013.01); *B01J 35/0066* (2013.01); *B01J 35/1019* (2013.01); *B01J 35/1038* (2013.01); *B01J 35/1042* (2013.01); *B01J 35/1061* (2013.01); *B01J 37/0009* (2013.01); *B01J 37/0236* (2013.01); *B01J 37/0242* (2013.01); *B01J 37/08* (2013.01); *B01J 37/20* (2013.01); *C10G 3/46* (2013.01); *C10G 3/48* (2013.01); *C10G 3/50* (2013.01); *C10G 2300/1014* (2013.01); *C10G 2300/202* (2013.01); *C10G 2300/207* (2013.01); *C10G 2300/70* (2013.01); *C10G 2400/02* (2013.01); *C10G 2400/04* (2013.01)

(58) Field of Classification Search
CPC ...... B01J 21/063; B01J 21/883; B01J 23/885; B01J 23/8878; B01J 23/7993; B01J 35/0066; B01J 35/1019; B01J 35/1038; B01J 35/1042; B01J 35/1061; B01J 37/0009; B01J 37/0236; B01J 37/0242; B01J 37/08; B01J 37/20; C10G 3/46; C10G 3/48; C10G 3/50; C10G 2300/1014; C10G 2300/202; C10G 2300/207; C10G 2300/70; C10G 2400/02; C10G 2400/04
USPC ......... 603/242, 263, 351; 502/242, 263, 351
See application file for complete search history.

(56) References Cited

U.S. PATENT DOCUMENTS

| | | |
|---|---|---|
| 3,173,883 A | 3/1965 | Cornellus et al. |
| 3,873,469 A | 3/1975 | Foster et al. |
| 4,076,792 A | 2/1978 | Foster et al. |
| 4,293,449 A | 10/1981 | Herrington et al. |
| 4,524,225 A | 6/1985 | Qualeatti et al. |
| 4,585,751 A | 4/1986 | Kukes et al. |
| 4,596,654 A | 6/1986 | Kukes et al. |
| 4,631,267 A | 12/1986 | Lachman et al. |
| 4,648,963 A | 3/1987 | Kutes et al. |
| 4,724,227 A | 2/1988 | Kukes et al. |
| 4,734,186 A | 3/1988 | Parrott et al. |

(Continued)

FOREIGN PATENT DOCUMENTS

| | | |
|---|---|---|
| AU | 2006200262 B2 | 10/2006 |
| CN | 1684765 A | 10/2005 |

(Continued)

OTHER PUBLICATIONS

Saih et al., "Ultra deep hydrodesulfurizetion of dibenzothiophene derivatives over NiMo/TiO2-Al2O3 catalysts", Applied Catalysis A: General 295 (2005) 11-22.

(Continued)

*Primary Examiner* — Patricia L. Hailey
(74) *Attorney, Agent, or Firm* — Westerman, Hattori, Daniels & Adrian, LLP

(57) ABSTRACT

A process for preparing a catalyst comprises coating substantial internal surfaces of porous inorganic powders with titanium oxide to form titanium oxide-coated inorganic powders. After the coating, an extrudate comprising the titanium oxide-coated inorganic powders is formed and calcined to form a catalyst support. Then, the catalyst support is impregnated with a solution containing one or more salts of metal selected from the group consisting of molybdenum, cobalt, and nickel.

26 Claims, No Drawings

(56) References Cited

U.S. PATENT DOCUMENTS

| | | | |
|---|---|---|---|
| 4,929,586 A * | 5/1990 | Hegedus | B01D 53/8628 502/217 |
| 5,089,462 A | 2/1992 | Wilson et al. | |
| 6,036,847 A | 3/2000 | Ziebarth et al. | |
| 7,267,761 B2 | 9/2007 | Balko | |
| 2002/0010088 A1 | 1/2002 | Eijsbouts et al. | |
| 2004/0118748 A1 | 6/2004 | Lesemann et al. | |
| 2004/0118749 A1 | 6/2004 | Lesemann et al. | |
| 2005/0107250 A1 | 5/2005 | Addiego et al. | |
| 2005/0272827 A1 | 12/2005 | Lok | |
| 2006/0060503 A1 | 3/2006 | Soled et al. | |
| 2010/0119994 A1 | 5/2010 | Feith | |
| 2011/0083997 A1 | 4/2011 | Silva | |
| 2011/0201855 A1 | 8/2011 | Marinangeli et al. | |
| 2012/0038717 A1 | 2/2012 | Niemiro et al. | |
| 2012/0190541 A1 * | 7/2012 | Koranne | B01J 21/063 502/439 |
| 2012/0318717 A1 | 12/2012 | Inoue et al. | |
| 2014/0045952 A1 | 2/2014 | Sandee et al. | |
| 2014/0194274 A1 * | 7/2014 | Tanaka | C23C 28/04 502/5 |
| 2015/0166901 A1 | 6/2015 | Traynor et al. | |
| 2015/0197461 A1 | 7/2015 | Meyer et al. | |

FOREIGN PATENT DOCUMENTS

| | | | |
|---|---|---|---|
| CN | 101191077 A | 6/2008 | |
| CN | 102639230 A | 8/2012 | |
| CN | 10 2781584 * | 11/2012 | B01J 31/34 |
| CN | 102781584 A | 11/2012 | |
| CN | 104368393 A | 2/2015 | |
| CN | 104508085 A | 4/2015 | |
| CN | 108348896 A | 7/2018 | |
| EP | 1150768 B1 | 5/2004 | |
| EP | 1150769 B1 | 6/2007 | |
| JP | 2004331444 A | 11/2004 | |
| JP | 2011-206695 A | 10/2011 | |
| JP | 2013-507238 A | 3/2013 | |
| JP | 2015-528747 A | 10/2015 | |
| JP | 2019500200 A | 1/2019 | |
| WO | WO2000041811 A1 | 7/2000 | |
| WO | WO2008060979 A2 | 5/2008 | |
| WO | 2011/043995 A1 | 4/2011 | |
| WO | WO2013123315 A1 | 8/2013 | |
| WO | 2014/020507 A2 | 2/2014 | |
| WO | WO2015002868 A1 | 1/2015 | |
| WO | WO2017074909 A1 | 5/2017 | |

OTHER PUBLICATIONS

Arrouvel et al., "A density functional theory comparison of anatase (TiO2)-and γ-Al2O3-supported MoS2 catalysts", Journal of Catalysis 232 (2005) 161-178.

Costa et al., "Edge wetting effects of γ-Al2O3 and anatase-TiO2 supports by MoS2 and CoMo5 active phases; A DFT study", Catalysis Today 85 (2003) 61-72.

Saih and Segawa, "Tailoring of alumina surfaces as supports for NiMo sulfide catalysts in the ultra deep hydrodesulfurization of gas oil: Case study of TiO 2-coated alumina prepared by chemical vapor deposition technique", Catalysis Today 86 (2003) 61-72.

Yoshikawa et al., "Hydrodesulfurization of dibenzothlophenes over molybdenum catalyst supported on TiO2-Al2O3", Catalysis Today 45 (1998) 293-298.

Sault et al., "Ceramic catalyst materials", Proceedings of the Ninth Annual Conference On Fossil Energy Materials, SAND-96-1661C; CONF-9605167-7 (1996) 477-486.

Luo et al., "Titania-alumina composites", Materials Research Society Symposium—Proceedings, Better Ceramics Through Chemistry VI, 346 (1994) 445-450.

Office Aciton dated Jul. 1, 2020, issued in counterpart to CN Application No. 201680063338.9, with English translation (31 pages).

Office Action dated Nov. 4, 2020, issued in counterpart JP Office Action dated Nov. 4, 2020 with English translation. (19 pages).

Office Action dated Apr. 19, 2021, issued in counterpart CN application No. 201680063338.9, with English translation. (21 pages).

* cited by examiner

ACID-RESISTANT CATALYST SUPPORTS AND CATALYSTS

RELATED APPLICATIONS

This application claims priority and the benefit of the filing date of United States Provisional Patent Application No. 62/246,733 filed Oct. 27, 2015, and International Application No. PCT/US2016/058604 filed Oct. 25, 2016, the disclosures of which are hereby incorporated herein by reference.

STATEMENT REGARDING FEDERALLY SPONSORED RESEARCH OR DEVELOPMENT

This invention was made under CRADA PNNL/314 between W. R. Grace & Co.-Conn. and Battelle Memorial Institute, as operator of the Pacific Northwest National Laboratory on behalf of the United States Department of Energy. The Government has certain rights in this invention.

FIELD OF THE INVENTION

The present invention relates to catalyst supports and catalysts prepared using the supports, and more particularly to acid-resistant catalyst supports and catalysts prepared using the supports.

BACKGROUND

Fast pyrolysis is a process during which organic carbonaceous biomass feedstock, i.e., "biomass," such as wood waste, agricultural waste, algae, etc., is rapidly heated to between about 300° C. to about 900° C. in the absence of air using a pyrolysis reactor. Under these conditions, solid products, liquid products, and gaseous pyrolysis products are produced. A condensable portion (vapors) of the gaseous pyrolysis products is condensed into biomass-derived pyrolysis oil. Biomass-derived pyrolysis oil can be burned directly as fuel for certain boiler and furnace applications, and can also serve as a potential feedstock in catalytic processes for the production of fuels in petroleum refineries. Biomass-derived pyrolysis oil has the potential to replace up to 60% of transportation fuels, thereby reducing the dependency on conventional petroleum and reducing its environmental impact.

However, biomass-derived pyrolysis oil is a complex, highly oxygenated organic liquid having properties that currently limit its utilization as a biofuel. For example, biomass-derived pyrolysis oil has high acidity and a low energy density attributable in large part to oxygenated hydrocarbons in the oil, which undergo secondary reactions during storage. "Oxygenated hydrocarbons" as used therein are organic compounds containing hydrogen, carbon, and oxygen. Such oxygenated hydrocarbons in the biomass-derived pyrolysis oil include carboxylic acids, phenols, cresols, alcohols, aldehydes, etc. Conventional biomass-derived pyrolysis oil comprises about 30% by weight oxygen from these oxygenated hydrocarbons. Conversion of biomass-derived pyrolysis oil into biofuels and chemicals require full or partial deoxygenation of the biomass-derived pyrolysis oil. Unfortunately, deoxygenating biomass-derived pyrolysis oil often leads to rapid plugging or fouling of the processing catalyst in a hydrogenation reactor caused by the formation of solids from the biomass-derived pyrolysis oil. In addition, the harsh environments such as high acidity, high pressure and high temperature in the hydrogenation or other process of biomass-derived oxygenated feeds tend to dissolve or soften standard catalyst supports (e.g. aluminas) that are chosen partly for their strength and high surface area. The same harsh environments also tend to break ordinary acid-resistant supports (e.g. titania or zirconia) that lack both strength and surface area relative to alumina.

WO 2013/123166 discloses a catalyst support for the demetallation of metal-containing heavy oil feedstock. The catalyst support comprises alumina and 5% or less titania. The catalyst support is prepared by methods such as co-precipitating aluminum sulfate and titanium sulfate with sodium aluminate, mixing alumina and an amount of titania, or impregnating an alumina powder with a titanium compound. Catalysts prepared using the obtained catalyst support exhibit improved catalytic activity and stability to remove metals from heavy feedstocks during a hydroconversion process.

Catalysts used in a hydrogenation process generally comprise catalytically active metals from Groups 6, 9, 10, and 11 of The Periodic Table and are typically supported on alumina which may be combined with other inorganic refractory materials such as silica, magnesia, titania, zirconia, and the like. Secondary promoters or additives such as halogens, phosphorous and boron have also been used to enhance catalytic properties. To achieve the maximum effect from hydrogenation processes, it is necessary to optimize catalyst activity and selectivity to a desired hydrogenation reaction. Catalyst activity and selectivity is determined and affected by such factors as the nature and properties of the catalyst support, the catalytic agents, activity and selectivity of promoters as well as the preparation and activation method used.

BRIEF SUMMARY

The present invention provides catalyst supports and related catalysts combining high surface areas with resistance to leaching in acidic aqueous environments. In cases of formed (e.g. extruded) supports for use in continuous reactors, the present invention also adds the feature of adequate strength to the catalyst support to avoid breakage from particle-particle or wall-particle forces during extended use. This allows for survival of catalysts prepared using the catalyst support in harsh environments such as high acidity, high pressure, and high temperature in hydrogenation or other processing of biomass-derived oxygenated feeds.

Accordingly, one example of the present invention is a process for preparing an acid-resistant catalyst support. The process comprises coating substantial internal surfaces of porous inorganic powders with titanium oxide to form titanium oxide-coated inorganic powders. After the coating, an extrudate comprising the titanium oxide-coated inorganic powders is formed and calcined.

Another example of the present invention is a process for preparing a catalyst. The process comprises coating substantial internal surfaces of porous inorganic powders with titanium oxide to form titanium oxide-coated inorganic powders. After the coating, an extrudate comprising the titanium oxide-coated inorganic powders is formed and calcined to form a catalyst support. Then, the catalyst support is impregnated with a solution containing one or more salts of metal selected from the group consisting of molybdenum, cobalt, and nickel.

DETAILED DESCRIPTION

The present invention is described with reference to embodiments of the invention.

The following terms, used in the present description and the appended claims, have the following definition.

The term "support" refers to a material onto which an active catalyst material is applied. In the present invention, the support comprises a porous, titanium oxide-coated inorganic powder capable of having catalytic amounts of metals deposited on its surface.

The term "alumina" refers to any of the forms of aluminum oxide alone or as a mixture with small amounts of other metals and/or metal and non-metal oxides.

The term "coating" refers to covering surfaces, internal and/or external, of porous inorganic powders with a relatively thin, substantially uniform and continuous layer of titanium oxide.

One example of the present invention is a process for preparing an acid-resistant catalyst support. The process comprises coating substantial internal surfaces of porous inorganic powders with titanium oxide to form titanium oxide-coated inorganic powders. The inorganic powders may be selected from the group consisting of alumina powders, silica powders, silica-alumina powders, and mixtures thereof.

In one embodiment, the coating of internal surfaces comprises preparing an aqueous mixture slurry comprising porous inorganic powders, a soluble titanium oxide precursor, and optionally a chelating or complexing agent with a weight ratio of the soluble titanium oxide precursor (as titanium oxide) to the porous inorganic powders in a range of about 0.1 to about 1.0, preferably about 0.2 to about 0.8, and more preferably about 0.3 to about 0.6. Examples of suitable soluble titanium oxide precursor include, but are not limited to, titanyl sulfate, titanium chloride, titanium phosphate, titanium alkoxides or the like. The preferred soluble titanium oxide precursor is titanyl sulfate.

After the mixture slurry is formed, a basic solution is introduced to the mixture slurry to raise pH value of the mixture slurry to a resultant pH of between about 3.0 and about 7.0, preferably between about 3.5 to about 6.5, and more preferably between about 4.0 to about 6.0. The basic solution may be an inorganic basic solution or organic basic solution. Examples of suitable inorganic basic solution include, but are not limited to, ammonium hydroxide, ammonium carbonate, ammonium bicarbonate, an alkali metal hydroxide or carbonate or bicarbonate or an alkaline earth metal hydroxide, carbonate or bicarbonate or mixtures thereof. Examples of suitable organic basic solution include, but are not limited to, quaternary amines such as tri($C_1$-$C_3$) alkylammonium compounds as well as mono-, di-, and tri-($C_1$-$C_3$) alkanolamines. The preferred basic solution is ammonium hydroxide solution. The addition of the basic solution should be conducted at a substantially constant, slow rate with continuous mixing to cause uniform distribution of the basic solution throughout the mixture.

After the basic solution is introduced into the mixture slurry, the resultant mixture slurry is aged to form titanium oxide-coated inorganic powders. The aging may be performed at a pH of about 3.5 to 7.0, preferably about 4.0 to 6.5, and more preferably about 4.5 to about 6.0 for at least about 1 hour, preferably about 2 hours. If the pH of the resultant mixture slurry fluctuates to a pH outside of the indicated pH range, it should be adjusted to be within the indicated range during the aging period.

In another embodiment, the coating of internal surfaces comprises preparing a slurry of porous inorganic powders in water. Portions of a solution comprising a soluble titanium oxide precursor and optionally a chelating or complexing agent and a basic solution are introduced alternately in 2 or more portions of each type into the slurry to form a mixture slurry. A resultant pH of the mixture slurry is maintained in a range of about 3.0 and about 7.0, preferably between about 3.5 and about 6.5, and more preferably between about 4.0 and about 6.0, during a period of introducing the solution comprising the soluble titanium oxide precursor and the basic solution. A weight ratio of the total soluble titanium oxide precursor introduced into the mixture slurry (as titanium oxide) to the porous inorganic powders is in a range of about 0.1 to about 1.0, preferably about 0.2 to 0.8, and more preferably about 0.3 to about 0.6. The mixture slurry is then aged to form titanium oxide-coated inorganic powders. The aging may be performed at a pH of about 3.5 to about 7.0, preferably about 4.0 to about 6.5, and more preferably about 4.5 to about 6.0, for at least about 1 hour, and preferably about 2 hours. The preferred soluble titanium oxide precursor is titanyl sulfate. The preferred basic solution is ammonium hydroxide solution.

In another embodiment, the coating of internal surfaces comprises preparing a slurry of porous inorganic powders in water. A solution comprising a soluble titanium oxide precursor and optionally a chelating or complexing agent and a basic solution are introduced simultaneously into the slurry at a controlled relative rate to form a mixture slurry. A resultant pH of the mixture slurry is maintained in a range of about 3.0 to about 7.0, preferably about 3.5 to about 6.5, more preferably about 4.0 to about 6.0, during a period of introducing the solution comprising the soluble titanium oxide precursor and the basic solution. A weight ratio of the total soluble titanium oxide precursor introduced into the mixture slurry (as titanium oxide) to the porous inorganic powders is in a range of about 0.1 to about 1.0, preferably about 0.2 to about 0.8, and more preferably about 0.3 to 0.7. The mixture slurry is then aged to form titanium oxide-coated inorganic powders. The aging may be performed at a pH of about 3.5 to about 7.0, preferably about 4.0 to 6.5, and more preferably about 4.5 to about 6.0, for at least about 1 hour, preferably about 2 hours. The preferred soluble titanium oxide precursor is titanyl sulfate. The preferred basic solution is ammonium hydroxide solution.

In another embodiment, the coating of internal surfaces comprises impregnating with incipient wetness porous inorganic powders with a solution comprising a soluble titanium oxide precursor and optionally a chelating or complexing agent. A weight ratio of the soluble titanium oxide precursor (as titanium oxide) in the solution to the porous inorganic powders is in a range of about 0.1 to about 1.0, preferably about 0.2 to about 0.8, and more preferably about 0.3 to about 0.6. The impregnated porous inorganic powders are then treated with a basic solution. The treated porous inorganic powders are then aged to form titanium oxide-coated inorganic powders.

Substantial internal surfaces of inorganic powders are coated with titanium oxide during the coating of internal surfaces. The term "substantial" as used herein with regard to alumina powders or silica-alumina powders indicates that a Ti/Al ratio as measured by x-ray photoelectron spectroscopy of the titanium oxide-coated inorganic powders is less than about 4.5, an amount of Al dissolved as measured by an acid-leaching test of an extruded support comprising the titanium oxide-coated inorganic powders is less than about 70 ppm, and an amount of $SO_2$ adsorption as measured by an adsorption test of an extruded support comprising the titanium oxide-coated inorganic powders is less than about 2.7% by weight of the catalyst support. During the coating of internal surfaces, external surfaces of inorganic powders may also be coated partly or wholly.

After the coating of the internal surfaces, the titanium oxide-coated inorganic powders are washed several times with first a solution of ammonium carbonate or similar salt such as ammonium sulfate and then with de-ionized water to remove residual ions. The washed titanium oxide-coated inorganic powders are then partially dried, which are then optionally formed into larger support particles. In one embodiment, the partially dried titanium oxide-coated inorganic powders are treated with a peptizing agent to peptize the inorganic powders prior to forming larger support particles by extrusion. Suitable peptizing agents include, but are not limited to, strong monobasic acids such as nitric acid or hydrochloric acid, organic acids such as formic acid, acetic acid or propionic acid and aqueous bases such as ammonium hydroxide.

The process for forming an acid-resistant catalyst support may further comprise forming an extrudate comprising the titanium oxide-coated inorganic powders and calcining the extrudate.

In one embodiment, after the peptizing, forming the extrudate includes first forming an extrudable mixture comprising the titanium oxide-coated inorganic powders, an acid, and a binder. The mixture is then extruded to form the extrudate comprising the titanium oxide-coated inorganic powders. The binder may be methyl cellulose. The acid may be nitric acid.

The extrudate in accordance with the present invention may have various geometric forms, such as pellets, cylinders, rings, and symmetric and/or asymmetric polylobes, for instance, tri- or quadrulobes.

After the extrudate is formed, the extrudate is calcined to form the catalyst support. In one embodiment, the calcining of the extrudate is performed at a temperature ranging from about 500° C. to about 900° C., preferably about 600° C. to about 800° C., for a period of at least 1 hour, preferably about two hours.

Another example of the present invention is a process for forming a catalyst. The process may include coating substantial internal surfaces of porous inorganic powders with titanium oxide to form titanium oxide-coated inorganic powders. After the coating, an extrudate comprising the titanium oxide-coated inorganic powders may be formed. The extrudate is then calcined to form a catalyst support. The catalyst support is then impregnated with a solution of at least one catalytically active metal or metal precursor compound such as a metal nitrate salt. Preferably, the metal is distributed uniformly throughout the pores of the catalyst support. In a preferred embodiment, the solution of at least one catalytically active metal or metal precursor compound contains one or more salts of metal selected from the group consisting of molybdenum, cobalt, and nickel. The solution may further comprise one or more promoters selected from the group consisting of Cr, Cu, Ag, Fe, and Co.

A wide range of various impregnating methods may be used to support the catalytic active metals on the catalyst supports. It is possible to apply a plurality of impregnating steps or the impregnating solutions may contain one or more of the component or precursors to be deposited, or a portion thereof. Impregnating techniques, dipping methods, spraying methods, or the like can be used. In the case of multiple impregnations, dipping, and the like, drying and/or calcining may be carried out between steps.

After the impregnation, the catalyst support with the catalytic active metals may be then dried and calcined. The impregnated catalyst support with the catalytic active metals may be dried at a temperature in a range of about 100° C. to about 200° C. for at least about 1 hour, preferably about 2 hours. The dried catalyst support with the catalytic active metals may be thereafter calcined at a temperature and for a time sufficient to convert at least part, preferably all, of the metal components or precursors to the oxide form, i.e., in a range of about 600° C. to about 800° C. for about 1 hour to about 3 hours to form an acid-resistant catalyst.

The acid-resistant catalyst may be used in a process to hydrogenate oxygen-containing organic feeds, acid-containing organic feeds, crude petroleum feedstocks or pyrolysis oil. The catalyst may be sulfided either ex situ or in situ before hydrogenating. The acid-containing organic feeds may contain carboxylic acids or fatty acids.

Another example of the present invention is an acid-resistant catalyst support comprising titanium oxide-coated inorganic powders. In one embodiment, the acid-resistant catalyst support comprises titanium oxide-coated alumina powders or titanium oxide-coated silica-alumina powders. The catalyst support has a Ti/Al ratio of less than about 4.5, preferably about 3.0, more preferably about 2.0, as measured by x-ray photoelectron spectroscopy of the titanium oxide-coated powders. An amount of Al dissolved is less than about 70 ppm, preferably about 60 ppm, more preferably about 50 ppm, as measured by an acid-leaching test of an extruded support comprising the titanium oxide-coated powders. Furthermore, an amount of $SO_2$ adsorption is less than about 2.7%, preferably about 2.2 and more preferably about 1.7, by weight of the catalyst support as measured by an adsorption test of an extruded support comprising the titanium oxide-coated powders.

A catalyst may be formed by impregnating the acid-resistant catalyst support with a solution containing one or more salts of metal selected from the group consisting of molybdenum, cobalt, and nickel. The solution may further comprise one or more promoters selected from the group consisting of Cr, Cu, Ag, Fe, and Co.

The catalyst may be used in a hydrogenation process of oxygen-containing organic feeds, acid-containing organic feeds, or crude petroleum feedstocks or pyrolysis oil. The catalyst may be sulfided either ex situ or in situ before hydrogenating. The acid-containing organic feeds may contain carboxylic acids or fatty acids.

In one embodiment, a biomass-derived pyrolysis oil is exposed to the catalyst under hydroprocessing conditions to produce low oxygen biomass-derived pyrolysis oil by converting at least a portion of the oxygenated hydrocarbons in the treated biomass-derived pyrolysis oil into hydrocarbons. Biomass-derived pyrolysis oil may be produced, for example, from pyrolysis of biomass in a pyrolysis reactor. Virtually any form of biomass can be used for pyrolysis to produce biomass-derived pyrolysis oil. Biomass-derived pyrolysis oil may be derived from biomass material such as wood, agricultural waste, nuts and seeds, algae, grasses, forestry residues, or the like. The biomass-derived pyrolysis oil may be obtained by different modes of pyrolysis, such as fast pyrolysis, vacuum pyrolysis, catalytic pyrolysis, and slow pyrolysis or the like. Biomass-derived pyrolysis oil composition is somewhat dependent on feedstock and processing variables. Preferably, substantially all of the oxygenated hydrocarbons are converted into hydrocarbons.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Hereinafter, the present invention will be described in more detail with reference to Examples. However, the scope of the present invention is not limited to the following Examples.

EXAMPLES

Titanium Oxide-Coated Inorganic Powders

Example 1

The following is a step-wise procedure for manufacturing 20 lb batch of 35% $TiO_2$ on alumina SIRAL® 30 (from Sasol, a 30% $SiO_2/Al_2O_3$ pseudoboehmite product).
Formation of 14% Ammonia Solution:

60 lbs of de-ionized (DI) water and 60 lbs of ammonium hydroxide solution (29% as $NH_3$) were added in a drum and mixed.
Formation of Titanyl Sulfate Solution:

40 gal of de-ionized water, 74.6 lbs of titanyl sulfate in excess sulfuric acid (15% $TiOSO_4$ with 8.6% $TiO_2$ equivalent), and 3.3 lbs lactic acid were added in a drum and mixed to form a titanyl sulfate solution. A pH of the titanyl sulfate solution was adjusted to be about 2.5 with an ammonia solution, which was added over a period of about 30 minutes.
Formation of Titanium Oxide-Coated Alumina Powders:

20 gallons of de-ionized water was added into a strike tank. The DI water was agitated at 240 RPM. A pH meter was calibrated between 4 and 7 and placed into the strike tank. 15 lbs of SIRAL® powder was added into the strike tank with stirring until a consistent slurry was achieved. The slurry of SIRAL® and water was then heated to a temperature of about 95° C. Once at the temperature, pH of the slurry was measured. The pH of the slurry was then adjusted to be within about 4.8 to about 5.2 range with an ammonia solution.

The titanyl sulfate solution was pumped from the drum into the strike tank at about 1000 cc/min to form a mixture slurry. The pumping was paused after ⅓ of the total titanyl sulfate solution was added. The 14% ammonia solution was then pumped into the strike tank as slowly as possible to raise pH of the mixture slurry to about 5.0, for example, at a speed of 500 mL over 5-10 minutes. The mixture slurry was then aged for a total of about 45 minutes. The pH of the mixture slurry was measured.

The pumping of titanyl sulfate solution into the strike tank was resumed for the next ⅓ of titanyl sulfate solution, followed again by pumping ammonia solution to adjust pH of the mixture slurry to about 5.0 as slowly as possible, and then the mixture slurry was aged again. The titanyl sulfate-ammonia cycle was repeated a third time, but the pH of the mixture slurry was adjusted to be about 6.0. The mixture slurry was then aged for about 1 hour at about 95° C. The mixture slurry was adjusted with ammonia solution as needed to maintain pH of the mixture slurry within the range of about 5.8 to about 6.2 during the aging period. DI water was also added as necessary to maintain initial water slurry level throughout the aging period.

The mixture slurry was then transferred to a 4 pan suction filter and washed four times by adding the following solutions atop a filter cake respectively:

Wash 1: 50 gallons of 1.2% ammonium carbonate with a pH of about 9 at a temperature of about 70° C. (Formation of ammonium carbonate solution: 1180 g of ammonium carbonate in 50 gal of DI water. Add ammonia solution until pH of the solution is about 9).
Wash 2: 50 gallons of 1.2% ammonium carbonate at a temperature of about 70° C.
Wash 3: 50 gallons of de-ionized water at a temperature of about 70° C.
Wash 4: 50 gallons of de-ionized water at a temperature of about 70° C.

The filtered cake was then dried overnight at about 120° C. to obtain dried or partially dried titanium oxide-coated alumina powders.

Example 2

The following is a step-wise procedure for pilot scale preparation of 20 lb batch of 35% $TiO_2$ on SIRAL® 30 (from Sasol, a 30% $SiO_2/Al_2O_3$ pseudoboehmite product).
Formation of 14% Ammonium Solution 60 lbs of de-ionized (DI) water and 60 lbs of ammonium hydroxide solution (29% as $NH_3$) were added in a drum and mixed.
Formation of Titanyl Sulfate Solution 50 gal (416 lbs) of de-ionized water and 65 lbs of titanyl sulfate in excess sulfuric acid (15% $TiOSO_4$; 8.6° % $TiO_2$ equivalent) were added into a drum and mixed to form a titanyl sulfate solution. A pH of the titanyl sulfate solution is measured.
Formation of Titanium Oxide-Coated Alumina Powders:

20 gallons of de-ionized water was pumped into a strike tank. An exhaust fan was turned on. The strike tank agitator was set at 40 Hz (240 RPM). A pH meter was calibrated between 4 and 7 and placed into the strike tank. 15 lbs of SIRAL® 30 was then added into the strike tank, stirred until a consistent slurry was achieved. A pH of the slurry was measured.

The SIRAL® 30 slurry in the strike tank was heated to a temperature of about 95° C. Once at the temperature, a pH of the slurry was measured. The 14% ammonia solution and the titanyl sulfate solution were simultaneously pumped to the strike tank to form a mixture slurry. The titanyl sulfate solution was pumped from the drum into the strike tank at a speed of about 1000 cc/min. The pumping speed of the ammonia solution was controlled to maintain the pH of the mixture slurry at about 4.0. The pH of the mixture slurry was measured after all the titanyl sulfate solution was added. The mixture slurry was then aged for about 1 hour at about 95° C. The mixture slurry was adjusted with an ammonia solution as needed to maintain the pH of the mixture slurry between about 4.25-4.75. De-ionized water was also added as necessary to maintain initial water slurry level throughout the aging period.

The slurry was then transferred to a 4 pan suction filter and was washed four times by adding the following solutions atop a filter cake respectively:

Wash 1: 50 gallons of 1.2% ammonium carbonate with a pH of about at a temperature of about 70° C.
Wash 2: 50 gallons of 1.2% ammonium carbonate at a temperature of about 70° C.
Wash 3: 50 gallons of de-ionized water at a temperature of about 70° C.
Wash 4: 50 gallons of de-ionized water at a temperature of about 70° C.

The filtered cake was then dried overnight at about 120° C. to obtain dried or partially dried titanium oxide-coated alumina powders.

Example 3

The process of Example 2 was followed, except for replacement of Siral® 30 by a pseudoboehmite alumina powder obtained from W.R. Grace. This is a hydrated alumina with a moisture content of 33% (67% solids). For consistency in the $TiO_2$/silica-alumina ratio, the 67% solids of the pseudoboehmite alumina powder required use of titanyl sulfate, $TiOSO_4$, at a ratio of 67/78 as compared with the SIRAL® 30 which has 78% solids.

Example 4

A slurry was formed by mixing 150 g of pseudoboehmite alumina (as in Example 3) and 1500 g of water. A pH of the slurry was measured to be about 8.0. The slurry was then heated to 95° C., when the pH of the slurry was measured to be about 7.

A first titanyl sulfate solution was prepared by mixing 230 g of titanyl sulfate, $TiOSO_4$ (from a stock solution having concentration equivalent to ~8% $TiO_2$), 11.4 g of concentrated lactic acid solution, 548 g water, and 285 mL of 14% $NH_3$ solution. The pH of the first titanyl sulfate solution was measured to be about 2.5.

A second titanyl sulfate solution was prepared by mixing 230 g of titanyl sulfate, $TiOSO_4$ (from the same stock solution as above), 11.4 g of lactic acid, 548 g water, and 234 mL of 14% $NH_3$ solution. A pH of the second titanyl sulfate solution was measured to be about 2.5.

A third titanyl sulfate solution was prepared by mixing 230 g of titanyl sulfate, $TiOSO_4$ ((from the same stock solution as above), 10.5 g of lactic acid, 503 g water, and 213 mL of 14% $NH_3$ solution. A pH of the third titanyl sulfate solution was measured to be about 2.5.

The first titanyl sulfate solution was added steadily with stirring, over a period of 45 minutes, to the alumina-water slurry to form a mixture slurry maintained at about 95° C. A pH of the mixture slurry was measured to be about 4.7 and was then further adjusted to be about pH 5.0 by addition of about 3 ml of 14% ammonia solution.

The second titanyl sulfate solution was then similarly added to the mixture slurry maintained at about 95° C., resulting in a pH of about 3.77, which was then adjusted to be about 5.0 as before, requiring about 20 mL of 14% ammonia solution.

The third titanyl solution was similarly added to the mixture slurry maintained at about 95° C., resulting in a pH of about 4.0, which was then adjusted to be about 6.0, requiring about 50 mL of 14% ammonium solution.

The resulting mixture slurry was then stirred and maintained at about 95° C. and about pH 6.0 (by small additions of ammonium solution) for a further 1 hour.

Extruded Catalyst Supports

Extrudable mixtures were formed in a Sigma mixer according to the following compositions below:
4540 g of powders of Examples 1, 2, or 3
22 g of METHOCEL™ binder (methyl cellulose)
90 g of concentrated $HNO_3$ solution
3 L of water
The water was added to the pre-blended dry mixture of powders and METHOCEL™ binder in small increments throughout the blending process in order to achieve wet consistency required for extrusion.

Each blend made as described above was then extruded using a 4" inch single auger extruder (available from Bonnot Company (Kent, Ohio), Model #4, Serial #2200), operating at a range of about 13-20 rpm rotation, with a die head having 1/20 inch (about 1 mm) diameter circular holes, forming cylindrical strands.

Extruded strands were dried overnight at about 120° C. and then calcined in air for about 1 hour at about 600° C.

A 400 g portion of the powder from Example 4 was also separately extruded at lab scale in a Bonnot 'BB Gun' single screw extruder. The extrusion mixture proportions, drying and calcinations conditions were the same as in the above description which used 4540 g of powders of Examples 1, 2, or 3.

Comparative Example 1

Comparative preparation of conventional alumina support by extrusion and calcinations. The extrusion and calcinations procedures in Example 4 were followed, except for the use of the pseudoboehmite alumina powders as used in Example 3 without the titanium oxide coating.

Characterization of Catalyst Supports

Surface Area and Porosity Measurement:
Extruded catalyst supports were analyzed for porosity by the following method:
A BET surface area was measured with maximum $N_2$ partial pressure of 0.967 atm. Pore volume was calculated from the above measurement, corresponding to maximum pore size of 600 Angstroms. Average pore diameter in Angstroms was calculated from the ratio of pore volume to surface area as determined above. Results of the measurement are shown in Table I.
Crush Strength Measurement:
Extruded catalyst supports were analyzed for strength by the following method:
Crush Strength was measured in lbs, using a Chatillon® DFE II force gauge from Ametek, and normalized to strand length in mm. Results of the measurement are shown in Table I.
Acid Resistance Test
The extruded supports were tested for resistance to acid leaching (partial dissolution) in the following test:
Extruded supports (300 mg) were weighed in stainless steel vials. Then 3000 uL of 10 wt % acetic acid in water was added to each vial. A stainless steel top plate was affixed to the plate along with pin-hole grafoil and Teflon barriers. The reactor headspace along with the headspace of each vial was pressurized to 100 psig with $H_2$, leak-checked for five minutes then depressurized to 15 psi. The reactor was pressurized again to 100 psig, held for 2 minutes then depressurized to 15 psi. The reactor was again pressurized again to 100 psig, held for 2 minutes then depressurized to 15 psig. Then the reactor was pressurized to 50 psig and sealed, shaking set to 500 rpm and the temperature was increased to 250° C. The reactor ran under the above conditions for 48 hours at which point the temperature was decreased to 20° C.

Inductively Coupled Plasma (ICP) analysis was performed on all of the resulting solutions to determine if the materials underwent leaching during the reactor test. The degree of leaching of Al was reported in ppm of dissolved Al. These results are also presented in Table I.

XPS Measurement

The powders were calcined at 600° C. for 1 hour, and then analyzed by X-ray photoelectron spectroscopy using the following method:

Measurements were carried out on a PHI 5600 ESCA system (d Physical Electronics) using an Aluminum Kα x-ray source (1486.6 eV) operated at 14.8 kV/25 mA energy. The instrument was equipped with a spherical capacitance analyzer (SCA) and a multichannel detector. The analyzer input slit was positioned at 45 degree relative to the material and a 0.125 eV energy resolution was used. Neutralization was performed using an electron flood gun.

A powder sample was loaded as a thin layer onto double-sided tape mounted to a 1" diameter stainless steel stub. The sample was transferred into the pre-chamber and pumped down to $5 \times 10^{-6}$ torr, then, introduced into the main analysis chamber where $10^{-9}$ to $10^{-10}$ torr vacuum was achieved. A 5-minute survey scan to identify all detectable elements from 0-1400 eV was performed. Based on the findings from the survey, a 120-minute detailed scan on C, O, Al and Ti was performed using an energy resolution of 0.125 eV.

The spectral data was imported into MULTIPAK v7.0.1, an external curve-fitting software package. All the curve-fitting and atomic concentration functions were performed using this software. All curve-fitting functions were shifted in reference to C1s spectra located at 284.7 eV. Sensitivity factors for each element were provided by PHI within the software and become part of the semi-quantitative atomic concentration calculations. Data was reported as normalized composition and Ti/Al ratio.

inversely with the success in getting the $TiO_2$ into the internal porosity of the alumina that is being coated. Conversely, if the $TiO_2$ remained outside this porosity, the measured Ti/Al ratio would be higher due to the surface sensitivity of the XPS method ('seeing' about 50 angstroms deep into a solid material). The goal of coating the internal surfaces thus translates into a goal of a relatively low Ti/Al ratio. These results are shown in Table I.

$SO_2$ Adsorption Test

The extruded supports were characterized by the following method which used $SO_2$ as a selective adsorbate probe for un-coated fractions of an alumina surface: First, a sample was placed into a TGA and a weight of the sample was recorded. Then, a temperature of the TGA was ramped to 350° C. at 20° C./min under Gas Mixture #1 (90% wt. inert gas/10% wt. $O_2$). The sample was held at 350° C. under Gas Mixture #1 until a stable weight (no weight gain or loss) was achieved. Once the sample weight became stable, time on stream and weight were recorded. The sample was allowed to cool to 60° C. while under flowing Gas Mixture #1. Once temperature was stable at 60° C., switch off Gas Mixture #1 and switch on Gas Mixture #2 (90.00% wt. inert gas/9.90% wt. $O_2$/0.10 wt % $SO_2$) into the reaction chamber, preferably at the surface of the sample. After the sample has been exposed to Gas Mixture #2 (Inert gas/$SO_2$/$O_2$) for 100 minutes, a weight gain was measured and recorded. The % weight gain from the above method is listed in Table I as "$SO_2$."

TABLE I

Properties of the catalyst supports

| | | | Extrudate | | | | | |
|---|---|---|---|---|---|---|---|---|
| Support Example No. | Powder XPS (Ti/Al ratio) | % $TiO_2$ | Crash Strength (lbs/mm) | Surface Area ($M^2$/g) | Pore Volume (cc/g) | Average Pore Diameter (Angst) | Acid Test (ppm Al in soln) | $SO_2$ (% wt gain) |
| Comparative example 1 | | 0 | 3.5 | 266 | 0.80 | 120 | 230 | 2.9 |
| 2 | 4.1 | 40 | 1.4 | 316 | 0.66 | 83 | 69 | 1.3 |
| 3 | 2.1 | 33 | 2.5 | 313 | 0.60 | 77 | NA | 1.7 |
| 4 | 1.2 | 36 | 3.7 | 250 | 0.60 | 67 | 42 | 2.6 |

TABLE II

Characterization of catalysts prepared using extruded supports

| Example | Support Example | Primary Metals | | Promoter | | Crush Strength (lbs/mm) | Surface Area ($M^2$/g) | Pore Volume (cc/g) | Average Pore Diameter (Ang.) |
|---|---|---|---|---|---|---|---|---|---|
| | | % $MoO_3$ | % NiO | type | wt % | | | | |
| 11-1 | comparative example 1 | 13.6 | 2.3 | | | 2.9 | 204 | 0.70 | 137 |
| 11-2 | 2 | 11.5 | 2.0 | none | | 2.6 | 226 | 0.52 | 93 |
| 11-3 | 4 | 12.0 | 2.1 | $Ag_2O$ | 1.0 | 3.7 | 199 | 0.49 | 99 |
| 11-4 | 4 | 11.8 | 1.9 | $Ag_2O$ | 1.9 | 3.1 | 193 | 0.50 | 103 |
| 11-5 | 4 | 11.6 | 1.9 | CuO | 3.0 | 4.0 | 190 | 0.47 | 100 |
| 11-6 | 4 | 11.4 | 1.9 | $Fe_2O_3$ | 3.0 | 3.8 | 200 | 0.49 | 98 |
| 11-7 | 4 | 12.2 | 2.1 | $Cr_2O_3$ | 3.1 | 4.8 | 203 | 0.48 | 99 |
| 11-8 | 4 | 13.6 | 1.0 | CoO | 1.5 | 3.1 | 194 | 0.48 | 99 |

At a fixed overall ratio of $TiO_2$ to $Al_2O_3$ (e.g. 35:65 by weight as practiced for samples herein), this ratio varies The supports made in Examples 2, 4 and comparative example 1 (standard alumina, comparative) were treated with the incipient wetness impregnation method. Each impregnation, summarized in Table II, used a standard Ni—Mo—P solution made from water, concentrated phosphoric acid, Ni carbonate and $MoO_3$, having nominal composition equivalent to approximately 220% Mo, 6% Ni, and 2.5% P. This resulted in about 12% of $MoO_3$, plus the levels of optional promoter additives shown. The sources of the promoters were $AgNO_3$, $CuNO_3$-$3H_2O$, $Fe(NO_3)_3$, and $Cr(NO_3)_3$. For the impregnations with Ag, the catalyst was dried after the first impregnation with Mo—Ni—P and impregnated a second time, while in the case of the other promoters, the promoter solutions were combined with the single Mo—Ni—P solution, in the proportions indicated. Final drying and calcination after impregnation(s) were done at about 120° C. and 600° C., for about 1 hour each, respectively.

Catalytic Testing

The catalysts of Examples 11-1 to 11-8 were each tested one at a time in a fixed bed hydrotreating reactor system (dimensions of bed ½"ID, ¾" OD, 25" length, with a 3/16" thermal well) in which two catalyst beds were used. The top bed, of 36 mL packed volume, consisted of the support of Example 3 impregnated with Ru at 7.8% and was operated at 190° C. The bottom or second bed, of 32 mL packed volume, consisted of an Example 11 catalyst and was operated at 400° C. These catalysts were sulfided in situ (to get the active form for hydrotreating) using the following method: First, a temperature was raised from room temperature to 150° C. in $H_2$ at 1830 psig, held at 150° C. for 2 hrs in $H_2$ and sulfiding agent (35% DTBDS, di tert-butyl disulfide in decane, 'Sulfrazol'). Second, the temperature was raised again from 150 to 250° C. over 1.2 h then held at 250° C. for 5.8 h in $H_2$ and sulfiding agent. Third, the temperature was raised again from 150 to 400° C. over 3 h then held at 400° C. for 4 h in $H_2$ and sulfiding agent. Overall, the sulfiding agent LHSV was 0.12 cm3/cm3-cat/h for total; and the flow ratio of $H_2$/liquid was 1890 $cm^3$ $H_2/cm^3$.

The feed was a pyrolysis oil derived from pine, obtained from VTT (Finland), spiked with the same sulfiding agent DTBDS to 150 ppm of S. The feed contained 54% oxygen overall and 30% water, and had a density of 1.2 g/mL. The liquid and gas flow rates were 0.09 and 183 mL/minute, respectively. Samples of product were removed for analysis by GC and SIMDIST, and the summary of the product distributions were as follows:

making products in the desired gasoline and diesel ranges (boiling points up to 334° C.). The remaining ~10-13% of the product assay is accounted for by 'heavies' with higher molecular weight and boiling points (>344° C.).

This catalytic performance data indicates utility of the supports for both Ru and Mo—Ni type catalysts. When combined with the improved tolerance for acids of Example 8, this shows improved utility for hydrogenation in aqueous acidic systems including pyrolysis oil and, in general, feeds derived from biomass and oxygen-rich organic sources.

The invention claimed is:

1. A process for preparing an acid-resistant catalyst support, the process comprising:
    coating substantial internal surfaces of porous inorganic powders with titanium oxide to form titanium oxide-coated inorganic powders,
    wherein a Ti/Al ratio as measured by x-ray photoelectron spectroscopy of the titanium oxide-coated inorganic powders is less than about 4.5.

2. The process of claim 1, wherein the process further comprises
    forming an extrudate comprising the titanium oxide-coated inorganic powders; and
    calcining the extrudate.

3. The process of claim 2, wherein the process further comprises, between the coating of internal surfaces and forming the extrudate,
    washing the titanium oxide-coated inorganic powders to remove residual ions;
    partially drying the titanium oxide-coated inorganic powders; and
    forming the partially dried titanium oxide-coated inorganic powders into support particles.

4. The process of claim 2, wherein forming the extrudate comprises:
    forming an extrudable mixture comprising the titanium oxide-coated inorganic powders, an acid, and a binder; and
    extruding the mixture to form the extrudate comprising the titanium oxide-coated inorganic powders.

5. The process of claim 4, wherein the extrudate is in a form of pellet, ring, cylinder rod, or polylobe.

6. The process of claim 4, wherein the binder is methyl cellulose.

7. The process of claim 4, wherein the acid is nitric acid.

TABLE III

Catalyst Testing

| | | | | | | Hydrotreating of Pyrolysis Oil (% yields at indicated time) | | | | | |
|---|---|---|---|---|---|---|---|---|---|---|---|
| Catalyst | Support | Primary Metals | | Promoter | | 30 hrs | | 42 hrs | | 54 hrs | |
| Example | Example | % $MoO_3$ | % NiO | type | wt % | Gasoline | Diesel | Gasoline | Diesel | Gasoline | Diesel |
| 11-1 | 3 ($Al_2O_3$ baseline) | 13.6 | 2.3 | NA | | 45 | 45 | 43 | 44 | 43 | 42 |
| 11-2 | 2 | 11.5 | 2.0 | none | | 53 | 43 | 51 | 43 | 50 | 43 |
| 11-4 | 4 | 11.8 | 1.9 | $Ag_2O$ | 1.9 | 47 | 37 | 47 | 36 | NA | NA |
| 11-5 | 4 | 11.6 | 1.9 | CuO | 3.0 | 53 | 40 | 50 | 40 | 48 | 40 |
| 11-6 | 4 | 11.4 | 1.9 | $Fe_2O_3$ | 3.0 | 49 | 42 | 48 | 38 | 46 | 37 |
| 11-7 | 4 | 12.2 | 2.1 | $Cr_2O_3$ | 3.1 | 43 | 45 | 46 | 40 | 45 | 42 |
| 11-8 | 4 | 13.6 | 1.0 | CoO | 1.5 | 50 | 40 | 47 | 39 | 41 | 39 |

This demonstrates that the catalysts based on novel supports (i.e. Examples 11-2 to 11-8 based on supports of Examples 2 and 4) perform generally as well or better than those based on traditional alumina supports, in terms of 8. The process of claim 2, wherein the calcining of the extrudates is performed at a temperature ranging from about 600° C. to about 800° C. for a period of from about 1 hour to about 2 hours.

9. The process of claim 1, wherein the inorganic powders are selected from the group consisting of alumina powders, silica powders, silica-alumina powders, and mixtures thereof.

10. The process of claim 1, wherein the coating of internal surfaces comprises:
preparing an aqueous mixture slurry comprising porous inorganic powders, a soluble titanium oxide precursor, and optionally a chelating or complexing agent with a weight ratio of the soluble titanium oxide precursor (as titanium oxide) to the porous inorganic powders in a range of about 0.1 to about 1.0;
introducing a basic solution to the mixture slurry to raise pH value of the mixture slurry to a resultant pH of between about 3.5 and about 6; and
aging the mixture slurry at a pH of 4.5 to 7.0 for at least about 1 hour to form titanium oxide-coated inorganic powders.

11. The process of claim 10, wherein the aging comprises aging the mixture slurry for about 1 hour to 3 hours.

12. The process of claim 10, wherein the soluble titanium oxide precursor is titanyl sulfate.

13. The process of claim 10, wherein the basic solution is ammonium hydroxide solution.

14. The process of claim 10, wherein the soluble titanium oxide precursor is titanium chloride.

15. The process of claim 1, wherein the coating of internal surfaces comprises:
preparing a slurry of porous inorganic powders in water;
introducing portions of a solution comprising a soluble titanium oxide precursor and optionally a chelating or complexing agent and a basic solution alternately in 2 or more portions of each type into the slurry to form a mixture slurry; and
aging the mixture slurry at a pH of 4.5 to 7.0 for at least about 1 hour to form titanium oxide-coated inorganic powders,
wherein a resultant pH of the mixture slurry is maintained in a range of about 3.5 to about 6 during a period of introducing the soluble titanium oxide precursor and the basic solution, and
a weight ratio of the total soluble titanium oxide precursor introduced into the mixture slurry (as titanium oxide) to the porous inorganic powders is in a range of about 0.1 to about 1.0.

16. The process of claim 15, wherein the aging comprises aging the mixture slurry for about 1 hour to 3 hours.

17. The process of claim 15, wherein the soluble titanium oxide precursor is titanyl sulfate.

18. The process of claim 15, wherein the basic solution is ammonium hydroxide solution.

19. The process of claim 1, wherein the coating of internal surfaces comprises:
preparing a slurry of porous inorganic powders in water;
introducing a solution comprising a soluble titanium oxide precursor and optionally a chelating or complexing agent and a basic solution simultaneously into the slurry at a predetermined relative rate to form a mixture slurry; and
aging the mixture slurry at a pH of 4.5 to 7.0 for at least about 1 hour to form titanium oxide-coated inorganic powders,
wherein a resultant pH of the mixture slurry is maintained in a range of about 3.5 to about 6.0 during a period of introducing the soluble titanium oxide precursor and the basic solution, and
a weight ratio of the total soluble titanium oxide precursor introduced into the mixture slurry (as titanium oxide) to the porous inorganic powders is in a range of about 0.1 to about 1.0.

20. The process of claim 19, wherein the aging comprises aging the mixture slurry for about 1 hour to 3 hours.

21. The process of claim 19, wherein the soluble titanium oxide precursor is titanyl sulfate.

22. The process of claim 19, wherein the basic solution is ammonium hydroxide solution.

23. The process of claim 1, wherein the coating of internal surfaces comprises:
impregnating with incipient wetness porous inorganic powders with a solution comprising a soluble titanium oxide precursor and optionally a chelating or complexing agent;
treating the impregnated porous inorganic powders with a basic solution; and
aging the treated porous inorganic powders at a pH of 4.5 to 7.0 for at least about 1 hour to form titanium oxide-coated inorganic powders,
wherein a weight ratio of the soluble titanium oxide precursor (as titanium oxide) to the porous inorganic powders is in a range of about 0.1 to about 1.0.

24. The process of claim 23, wherein the soluble titanium oxide precursor is titanyl sulfate.

25. The process of claim 23, wherein the basic solution is ammonium hydroxide solution.

26. The process of claim 1, wherein an amount of Al dissolved as measured by an acid-leaching test of an extruded support comprising the titanium oxide-coated inorganic powders is 70 ppm or less.

* * * * *